United States Patent [19]

Ogawa

[11] 3,777,062

[45] Dec. 4, 1973

[54] TRANSMISSION SYSTEM FOR A TIME-DIVISIONAL MULTIPLEX PSK SIGNAL

[75] Inventor: Akira Ogawa, Tokyo, Japan

[73] Assignee: Kokusai Denshin Denwa Kabushiki Kaisha, Tokyo, Japan

[22] Filed: July 17, 1972

[21] Appl. No.: 272,345

[30] Foreign Application Priority Data

July 20, 1971 Japan .............................. 46/53591

[52] U.S. Cl. ....... 178/69.5 R, 178/66 R, 179/15 BS

[51] Int. Cl. ................................................ H04l 7/00

[58] Field of Search ..................... 178/69.5 R, 66 R; 325/30; 179/15 BS

[56] References Cited

UNITED STATES PATENTS 3,444,320 5/1969 Miyagi........................ 179/15 BS X

*Primary Examiner*—Robert L. Richardson
*Attorney*—Robert E. Burns et al.

[57] ABSTRACT

A transmission system for a time-divisional multiplex PSK signal including a frame synchronization signal in addition to information channel signals, in which the number of quantum phase positions of the frame synchronization signal is smaller than the number of quantum phase positions of the information channel signals in the time-divisional multiplex PSK signal so that the frame synchronization signal and the information channel signals are transmitted by the same modulation rate.

4 Claims, 4 Drawing Figures

TRANSMISSION SYSTEM FOR A TIME-DIVISIONAL MULTIPLEX PSK SIGNAL

Figure 1A:
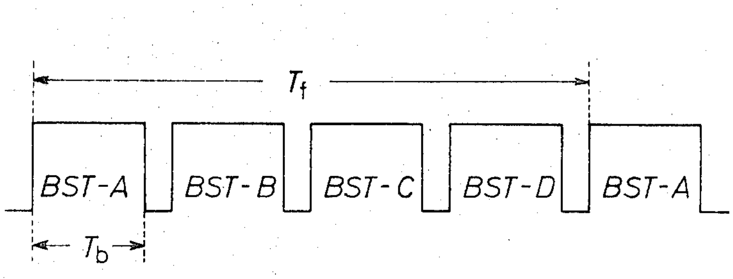

This invention relates to a transmission system for a time-divisional multiplex PSK signal and, in particular, to a transmission system for a digital phase-modulated wave used in time-divisional multiple-access satellite communications.

In a time-divisional multiple-access system used in satellite communications, a frame of transmitted signal is formed by a plurality of bursts which are respectively transmitted from a plurality of different terrestrial stations. The above mentioned burst mode signal is usually modulated by phase-shift keying (PSK) so as to have a plurality of possible quantum phase positions, while each of the bursts has an independent carrier frequency and an independent carrier phase position. A frame synchronization signal is included at the start position of each burst. The frame synchronization signal has a particular signal configuration and is employed as the time standard of each burst in addition to the function of identifying the transmitted terrestrial stations. As mentioned above, the frame synchronization signal is the most important signal in the time-divisional multiple-access system. Accordingly, detection of the frame synchronization signal must be performed under high reliability.

In conventional detection techniques for the frame synchronization signal, there are two problems which are non-detection and erroneous detection. At the non-detection, the frame synchronization signal is not detected at the normal occurrence time. At the erroneous detection, a frame synchronization signal is erroneously detected at the abnormal occurrence time. In this case, probability of each of the non-detection and the erroneous detection must be sufficiently reduced.

In the conventional transmission system, the frame synchronization signal and information channel signals are transmitted by the same number of quantum phase positions. Moreover, the probability of non-detection is caused to be suppressed by determining the number of allowable error-bits in the frame synchronization signal. Accordingly, the number of allowable error-bits must be determined as large as possible in order to sufficiently suppress the probability of non-detection. However, since increase of the number of allowable error-bits causes increase of the occurrence times of the erroneous detection, the length of the frame synchronization signal is necessary to be lengthened for avoiding the erroneous detection. This causes decrease of the occupation rate of the information channel in each burst, while a frame synchronization signal detector becomes complicated.

An object of this invention is to provide a transmission system for a time-divisional multiplex PSK signal capable of readily performing highly reliable detection of the frame synchronization signal in a simple manner.

In accordance with the principle of this invention, the bit error rate of the frame synchronization signal is improved in comparison with the bit error rate of the information channel in each burst by decreasing the number of quantum phase positions of the frame synchronization signal in comparison with the number of quantum phase positions of the information channel.

Figure 1B:
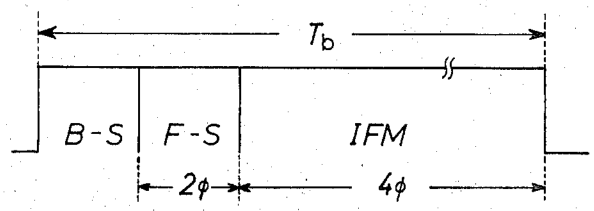

The principle, construction and operations of this invention will be understood from the following detailed discussion taken in conjunction with the accompanying drawings:

A frame $T_1$ of a time-divisional multiplex PSK signal used in this invention is formed by a plurality of bursts BST-A, BST-B, BST-C and BST-D, by way of example, each having a duration Tb as shown in FIG. 1A. Each of the bursts is formed by recovery bits B-S, a frame synchronization signal F-S and information channels IFM as shown in FIG. 1B. For example, the frame synchronization signal F-S is modulated by two-phase PSK while the information channels are modulated by four-phase PSK.

Figure 2:
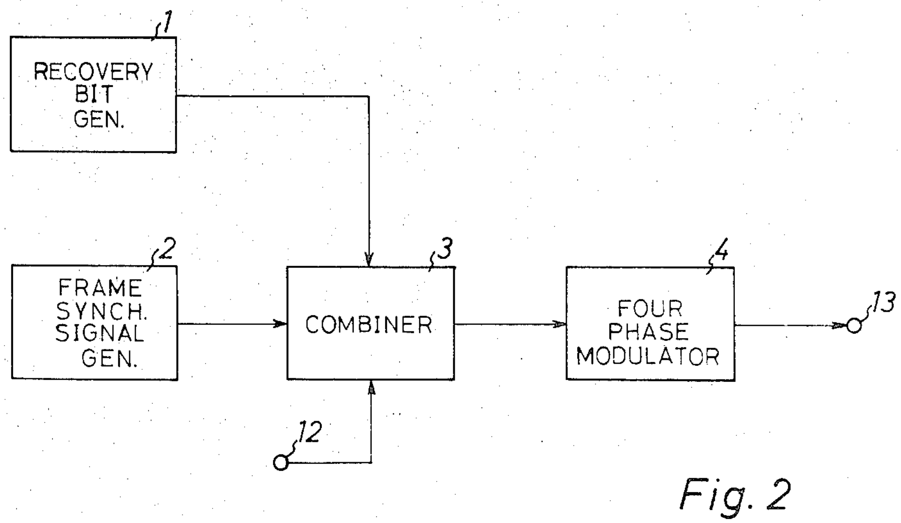

With reference to FIG. 2, a modulation apparatus for providing the above mentioned time-divisional multiplex PSK signal comprises a recovery bit generator 1, a frame-synchronization signal generator 2, an input terminal 12 for receiving information channel signal, a combiner 3 for combining the recovery bits from the recovery bit generator 1 and the frame synchronization signal from the frame synchronization signal generator 2 with the information channel signal as shown in FIG. 1B, a four phase modulator 4, and an output terminal 13. The four phase modulator 4 is a conventional four phase modulator known per se. The frame synchronization signal generator 2 generators, two bits by two bits, a binary coded signal. If a true signal configuration of the frame synchronization signal is a coded signal "101001100", the frame synchronization signal generator 2 generates a coded signal "110011000011110000". In a practical case, the first digit and the second digit of the two bits assume the same state "1" or "0", so that only two quantum phase positions corresponding to two code units "00" and "11" by way of example are employed in four code units "00", "01", "10" and "11" respectively corresponding to four possible quantum phase positions. A two-phase phase-modulated wave synchronized with the four-phase phase-modulated wave is obtained from the four phase modulator 4. Accordingly, if the information channel signal is modulated to a four-phase phase-modulated wave, a conventional four-phase modulator can be employed as the four phase modulator 4 without any modification. In the four phase modulator 4, different phase modulation or fixed phase modulation can be employed. However, the differential phase modulation is desirable since errors caused by the phase shift of the synchronous reference wave for demodulation can be avoided in a transmission system by the differential phase modulation.

Figure 3:
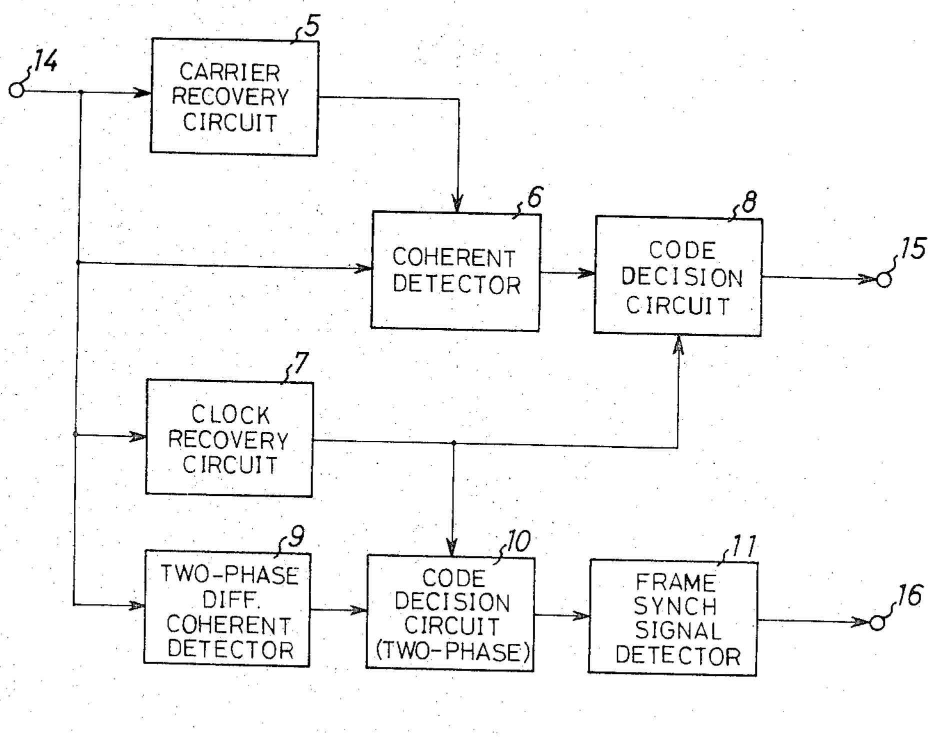

With reference to FIG. 3, a demodulation apparatus for demodulating a time-divisional multiplex PSK wave provided as mentioned above in accordance with this invention comprises an input terminal 14 for receiving an input PSK signal of burst mode, a carrier recovery circuit 5 for providing a reference carrier wave from the input PSK signal, a coherent detector 6 for phase-detecting the input PSK signal by the reference carrier wave from the carrier recovery circuit 5, a clock recovery circuit 7 for providing clock pulses so as to synchronize with signal elements of the input PSK signal, a code decision circuit 8 for determining successive signal elements of the detected output of the coherent detector 6 in synchronism with the clock pulses, and an output terminal 15 for obtaining a demodulated signal. The above mentioned circuitry is designed in the similar manner to a conventional demodulation device for a PSK wave. If the input PSK signal is a differential phase-modulated wave, a memory is provided in the carrier recovery circuit 5 or the code decision circuit 8 for temporarily storing the detected phase position or polarity of each signal element unit detection of an immediately succeeding signal element. The demodulation device shown in FIG. 3 further comprises a two-phase differential coherent detector 9, a code decision circuit 10, a frame synchronization signal detector 11 and an output terminal 16. The two-phase differential coherent detector 9 provides a delay memory having a delay time corresponding to the duration of each signal element of the frame synchronization signal and performs two-phase detection of the frame synchronization signal by use of a delayed frame synchronization signal as a reference. The above mentioned differential coherent detection has an error rate characteristic substantially equal to that of the synchronous detection in case of a two-phase PSK signal. Moreover, the two-phase differential coherent phase-detection has many advantages, such as a simple construction, ready fabrication, stable operations and unnecessity of the reference carrier. In particular, since the frame synchronization signal may have a function of synchronization bits employed for regenerating a reference carrier which is used for demodulating the information channel signal, the length of the recovery bits B-S can be reduced. In the differential coherent detection, the recovery bits are necessary for regenerating the clock pulses. However, a necessary signal-to-noise ratio for regenerating clock pulses may be relatively low in comparison with a necessary signal-to-noise ratio for regenerating a reference carrier. Accordingly, the duration of the recovery bits B-S becomes shorter. Moreover, since a sufficient time is given for regenerating a reference carrier wave used for demodulating the information channel signal while the duration of the recovery bits is short, the carrier recovery circuit 5 can be readily designed. The state "0" or "1" of each signal element of the frame synchronization signal (i.e., a two-phase phase-modulated wave) is detected by the code decision circuit 10 by use of the output of the two-phase differential coherent detector 9 and the clock pulses from the clock recovery circuit 7. The detected output pulses of the code decision circuit 10 are applied to the frame synchronization signal detector 11 (e.g. a bistable circuit), so that a detected frame synchronization signal is obtained at the output terminal 16.

The error rate characteristic of the differential coherent detection for a two-phase phase-modulated wave is sufficiently improved in comparison with the error rate characteristic of the synchronous detection for a four-phase phase-modulated wave. For example, if a bit error rate of the synchronous detection for a four - phase phase-modulated wave is a value of about $10^{-4}$, a bit error rate of the differential coherent detection for a two-phase phase-modulated wave is a value of about $10^{-7}$. Accordingly, the number of allowable error bits for detecting the frame synchronization signal may be determined at a sufficiently small value, while the probability of erroneous detection can be also reduced even if the number of bits of the frame synchronization signal is descreased. In other words, since the duration of a signal element of a two-phase phase-modulated wave is twice the duration of a signal element of a four-phase phase-modulated wave, the duration of the two-phase frame synchronization signal becomes twice the duration of the four-phase frame synchronization signal for the same number of bits therein. In this case, since the bit error rate for the two-phase phase-modulated wave is effectively improved in comparison with the bit error rate for the four-phase phase-modulated wave, the number of bits of the frame synchronization signal in case of two-phase modulation can be reduced under one half the number of necessary bits of the frame synchronization signal in case of four-phase modulation. Accordingly, the receiving device can be designed in a simple construction. Moreover, the occupation rate of the information channel signal can be increased in each burst since the duration of the frame synchronization signal can be reduced.

If the relatively complicated circuitry is allowable, synchronous detection of the frame synchronous signal may be also employed.

This invention can be also applied to another type of a time-divisional multiplex PSK signal of burst mode, in which the information channel signal is phase-modulated so as to have eight quantum phase positions or $2^n$ (more than eight) quantum phase positions, where "$n$" is a positive integer. In this case, the number of necessary bits of the frame synchronization can be further reduced.

This invention is also applied to another PSK system, such as a radio PCM (pulse code modulation) -PSK circuit and a PCM-PSK telemetering system in addition to the above mentioned time-divisional multiplex PSK signal of burst mode.

What I claim is:

1. A transmission system for a time-divisional multiplex PSK signal including a frame synchronization signal in addition to information channel signals, comprising:

input terminal means for receiving an information channel signal;

first generator means for generating clock pulse timed with the clock timing of the information channel signal;

second generator means for generating a frame synchronization signal timed with the clock timing of the information channel signal so that the frame synchronization signal is formed by successive combinations of adjacent two signal elements having the same state;

combine means coupled with said input terminal means, said first generator means and second generator means for combining the information channel signal, the clock pulses and the frame synchronization signal in the predetermined order so as to produce a combined signal;

modulation means coupled to said combine means for providing a phase-modulated wave, in which the number of quantum phase positions of the frame synchronization signal is smaller than the number of quantum phase positions of the information channel signal; and output terminal means for transmitting the phase-modulated wave for providing the time-divisional multiplex PSK signal.

2. A transmission system according to claim 1, in which the number of quantum phase positions of the frame synchronization signal is two while the number of quantum phase positions of the information channel signal is four.

3. A transmission system according to claim 1, in which the number of quantum phase positions of the frame synchronization signal is two while the number of quantum phase positions of the information channel signal is eight.

4. A transmission system according to claim 1, in which the number of quantum phase positions of the frame synchronization signal is two while the number of quantum phase positions of the information channel signal is $2^n$, where "$n$" is a positive integer more than three.

* * * * *